May 3, 1955
G. A. LYON
2,707,449
METHOD OF MAKING WHEEL TRIM OR COVERS
Filed Aug. 3, 1953
9 Sheets-Sheet 9
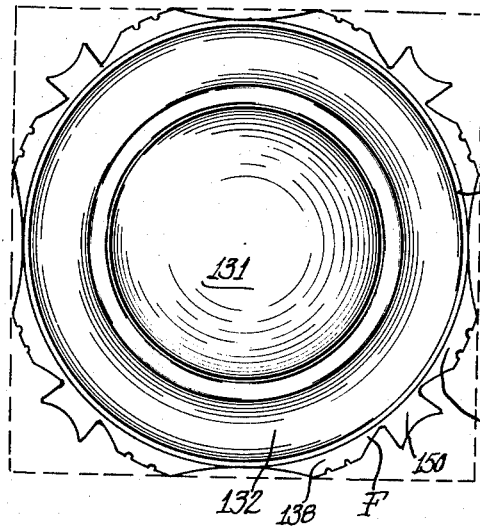
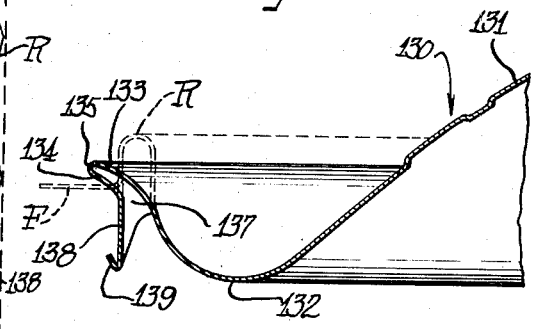
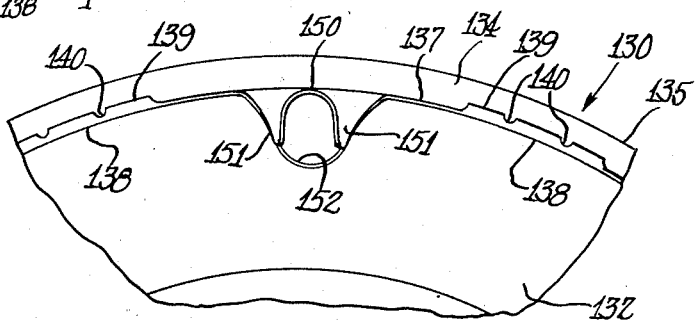
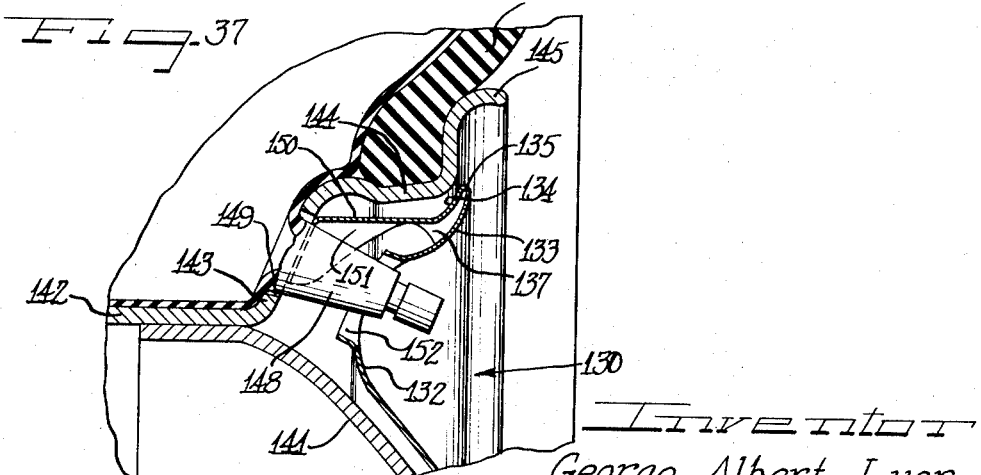
Inventor
George Albert Lyon

United States Patent Office 2,707,449
Patented May 3, 1955

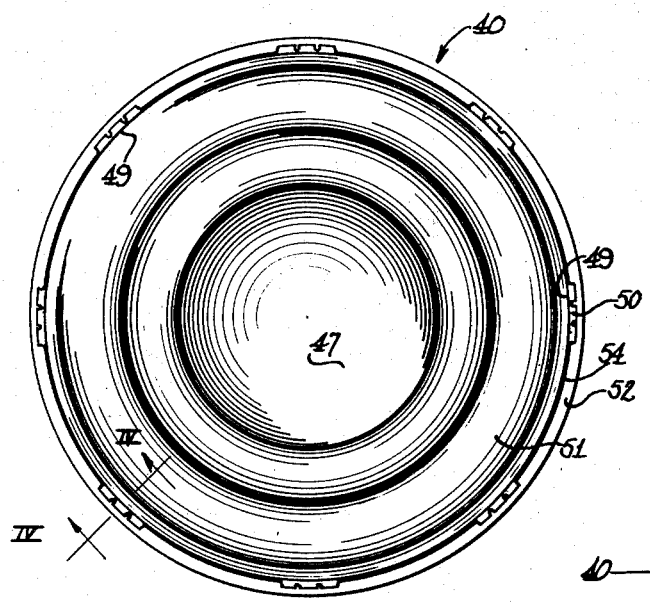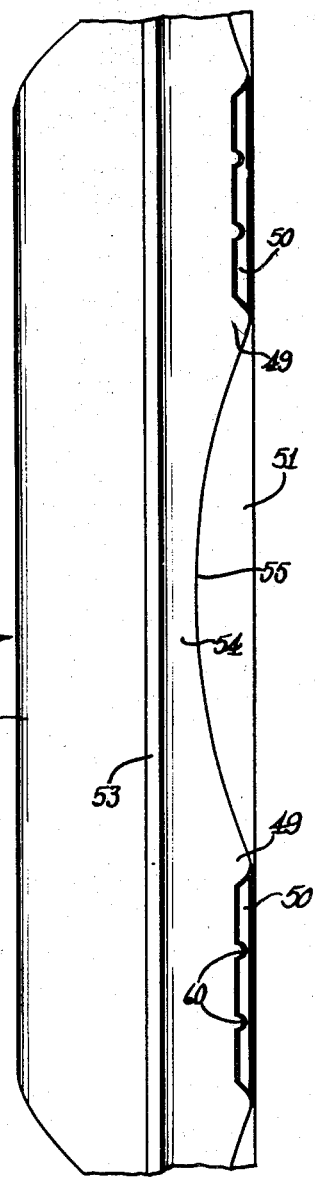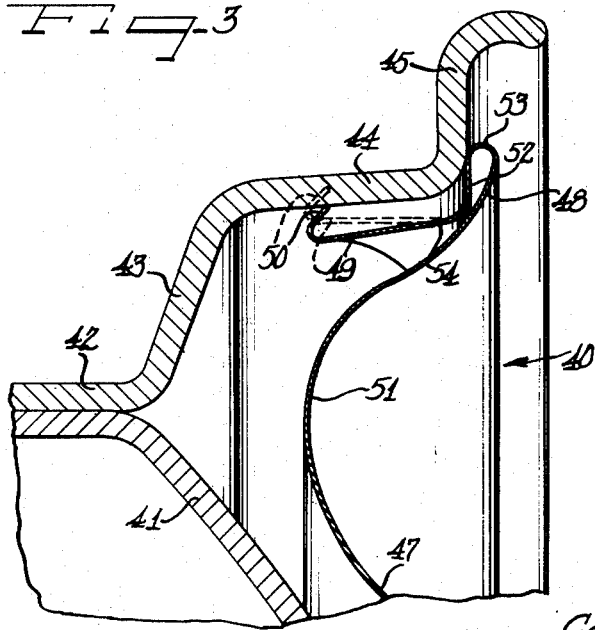

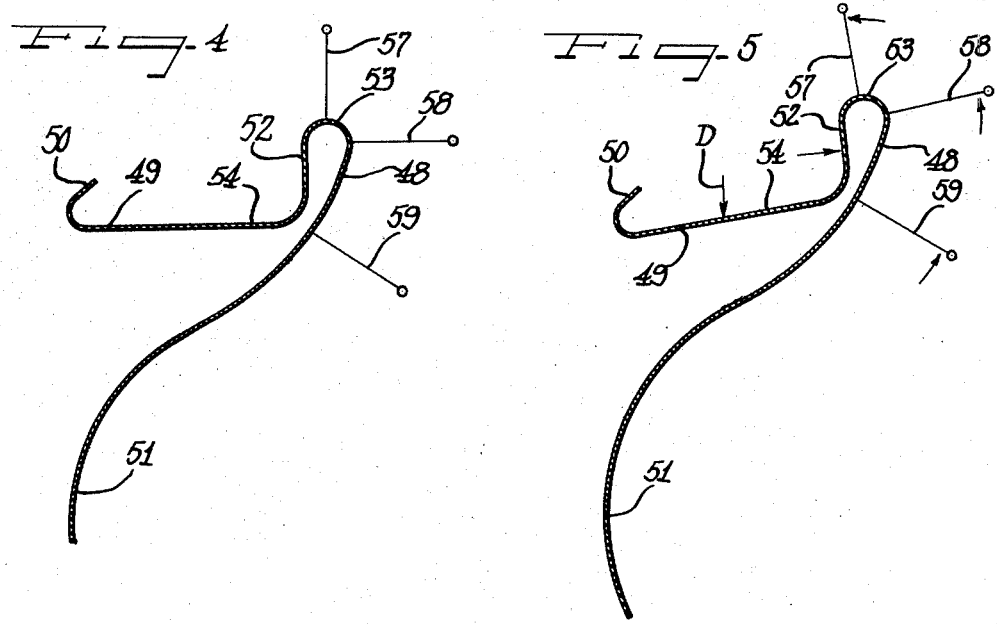
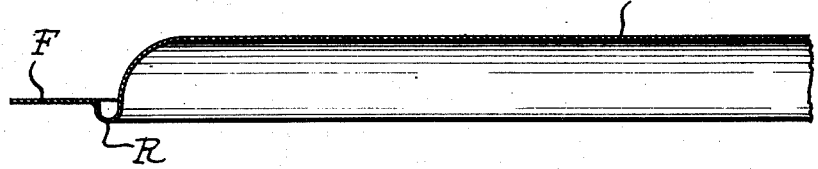
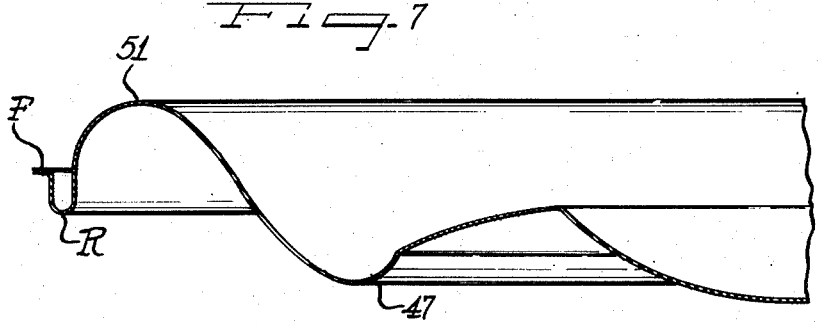

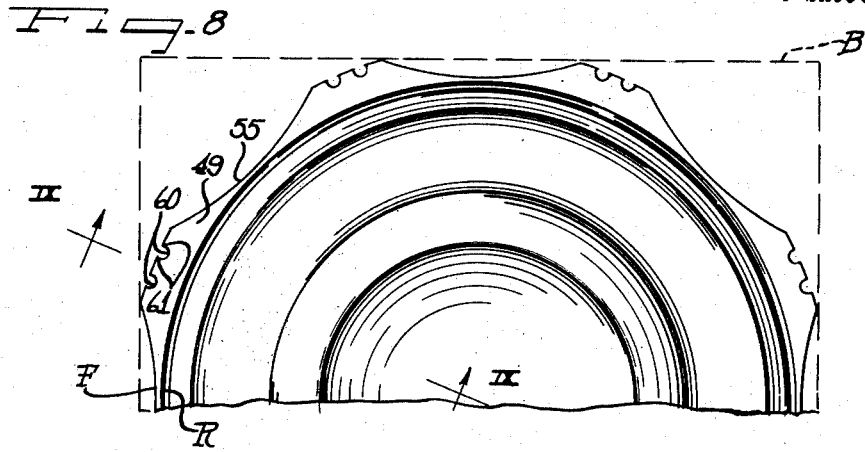
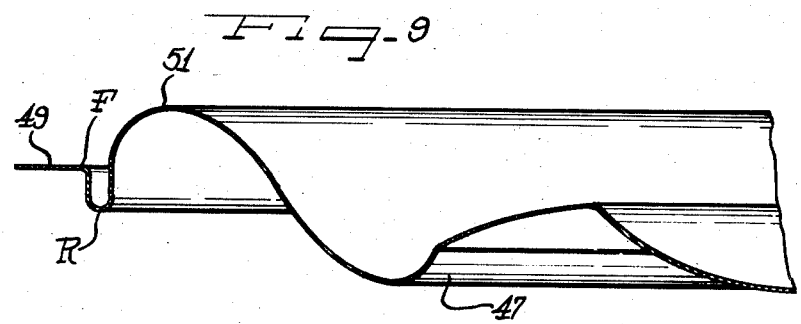
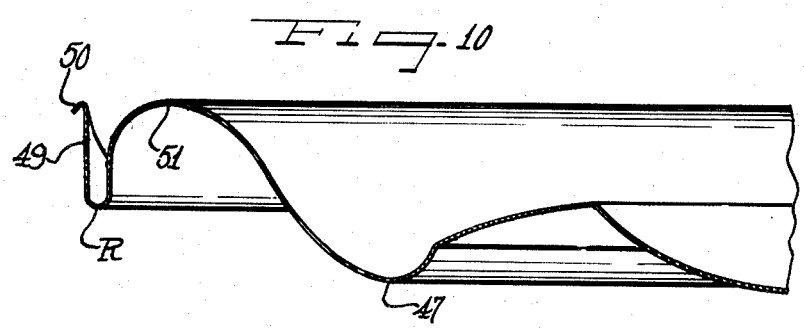

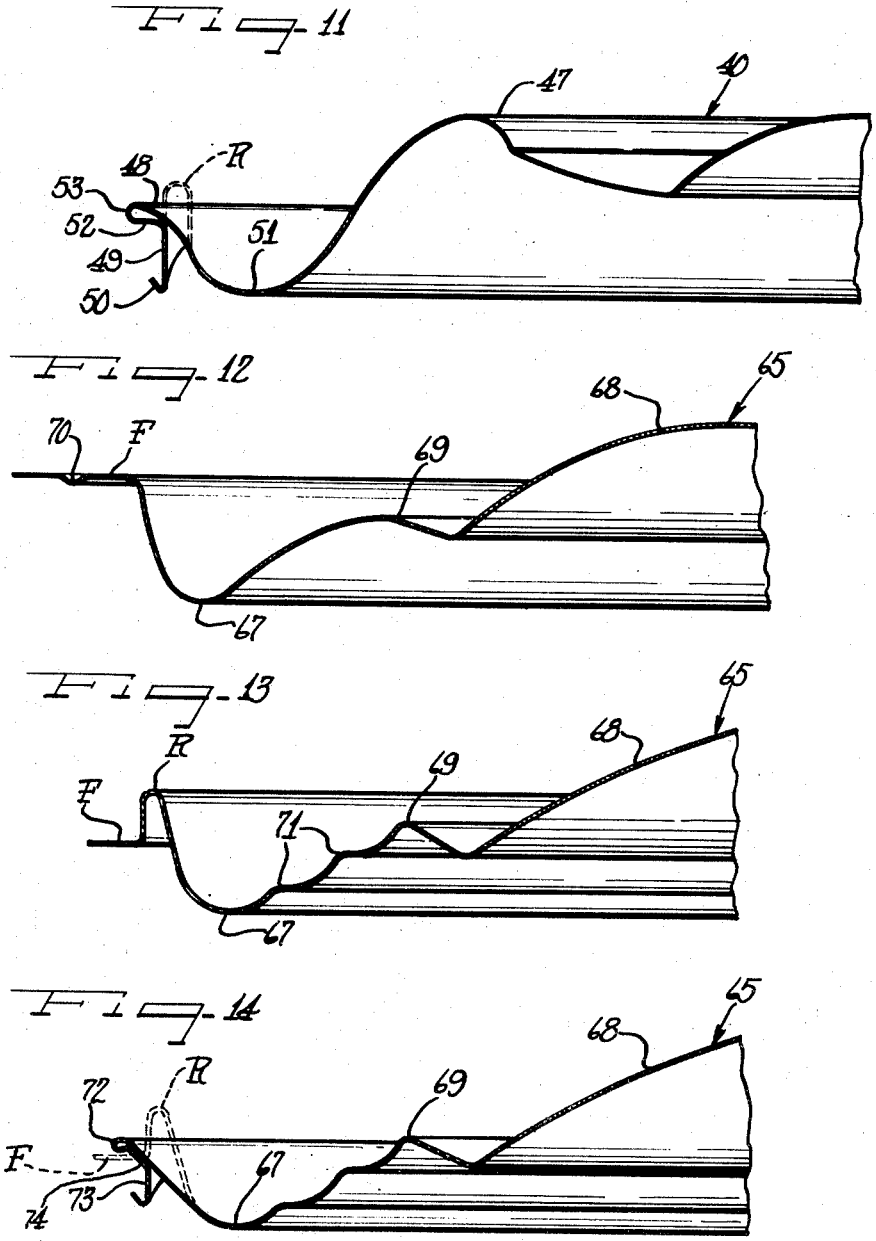

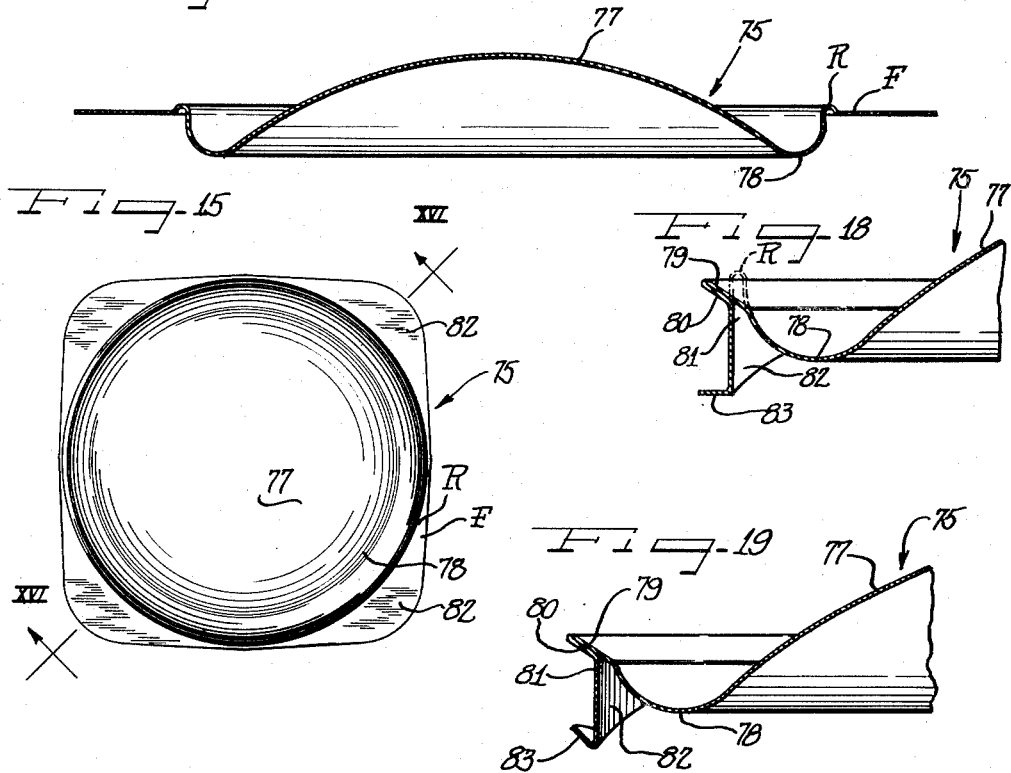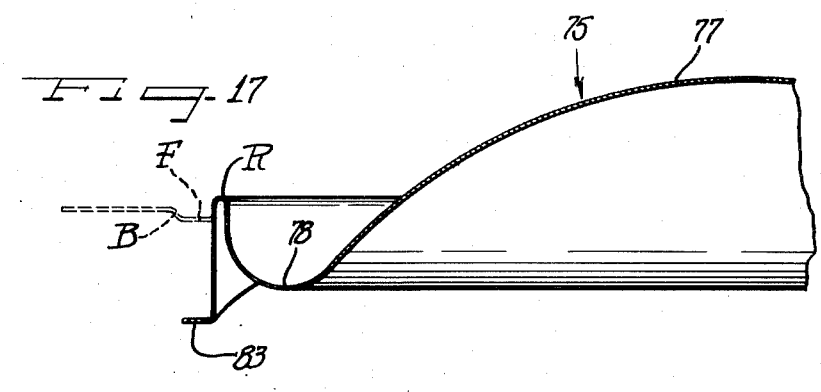

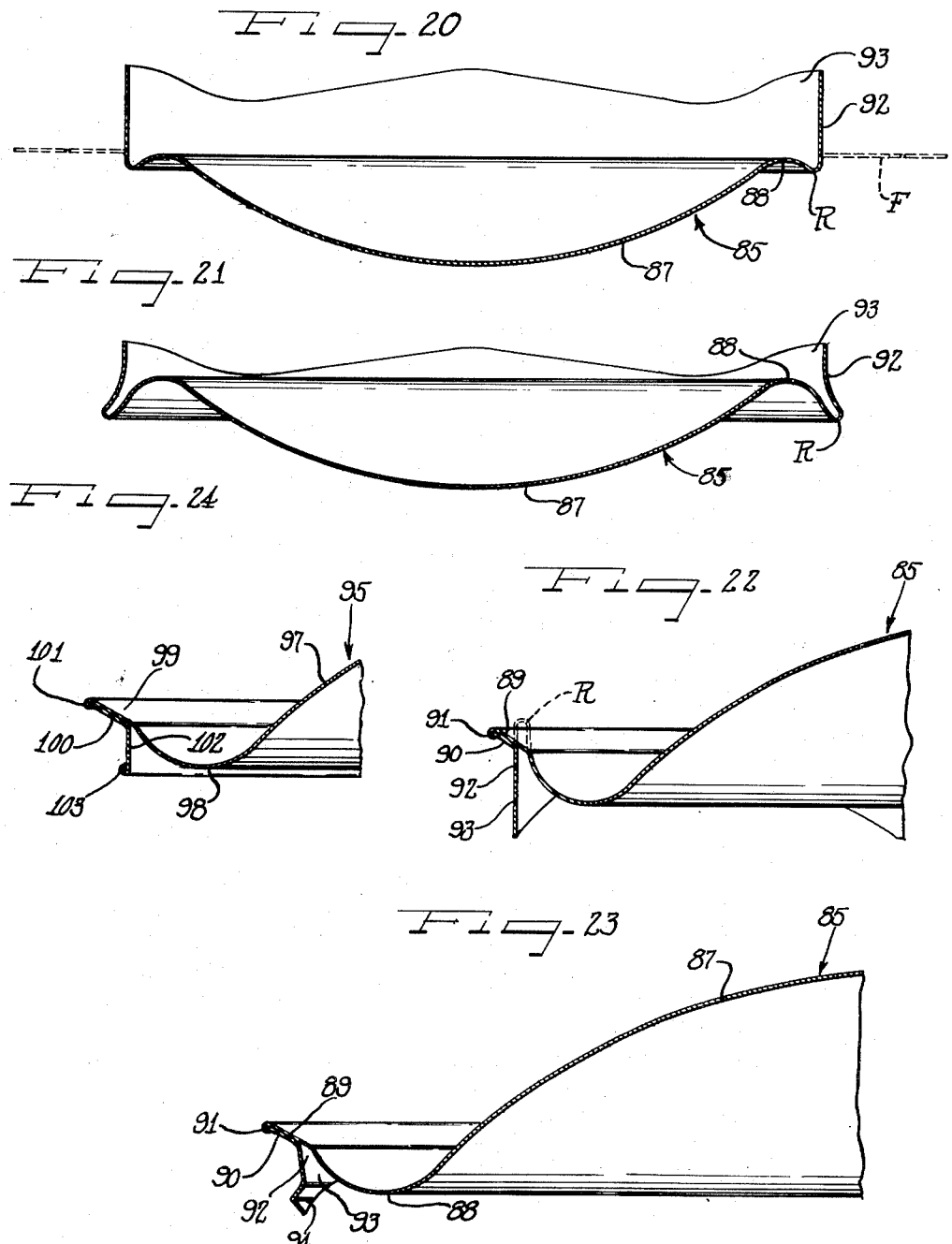

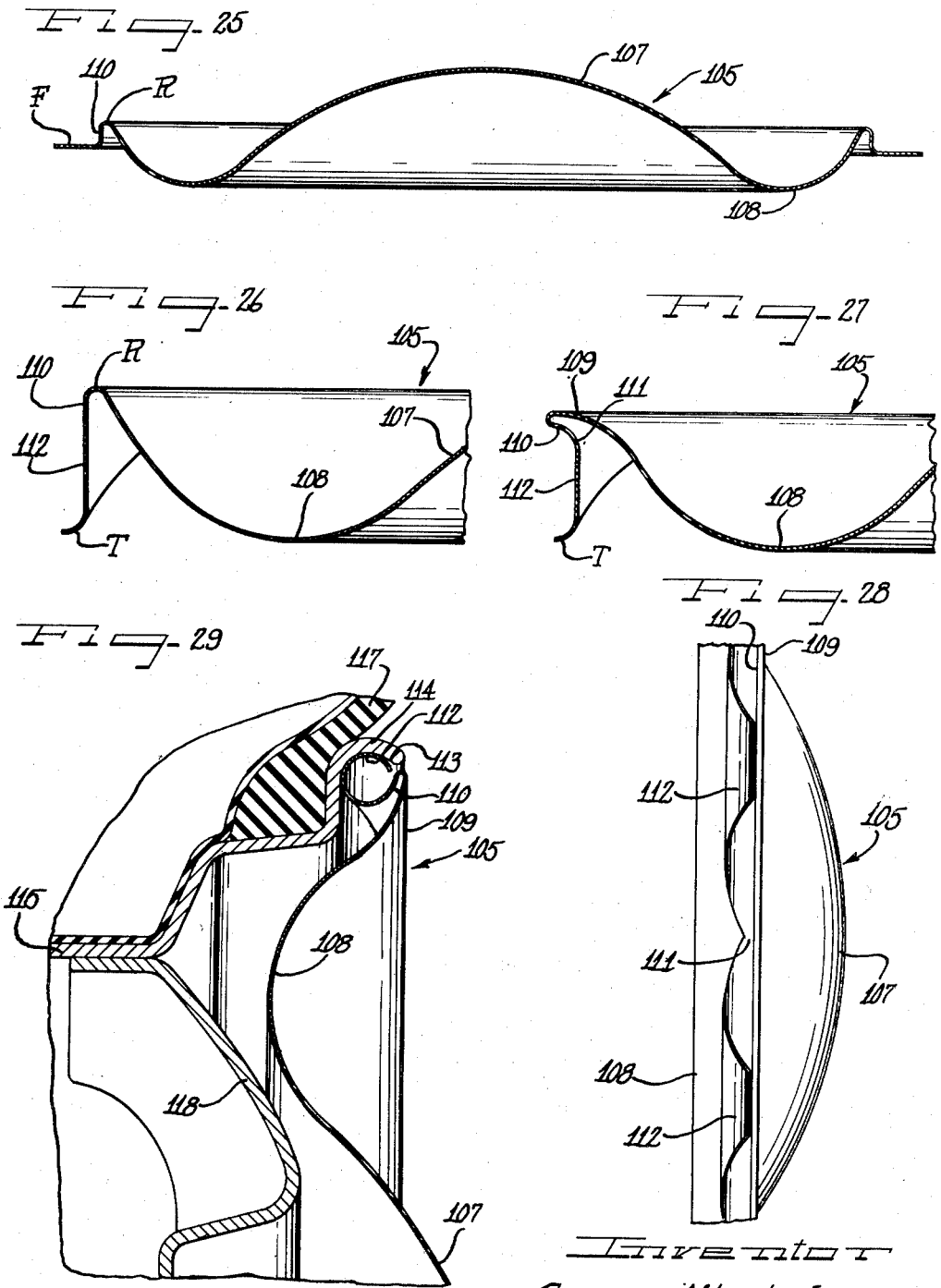

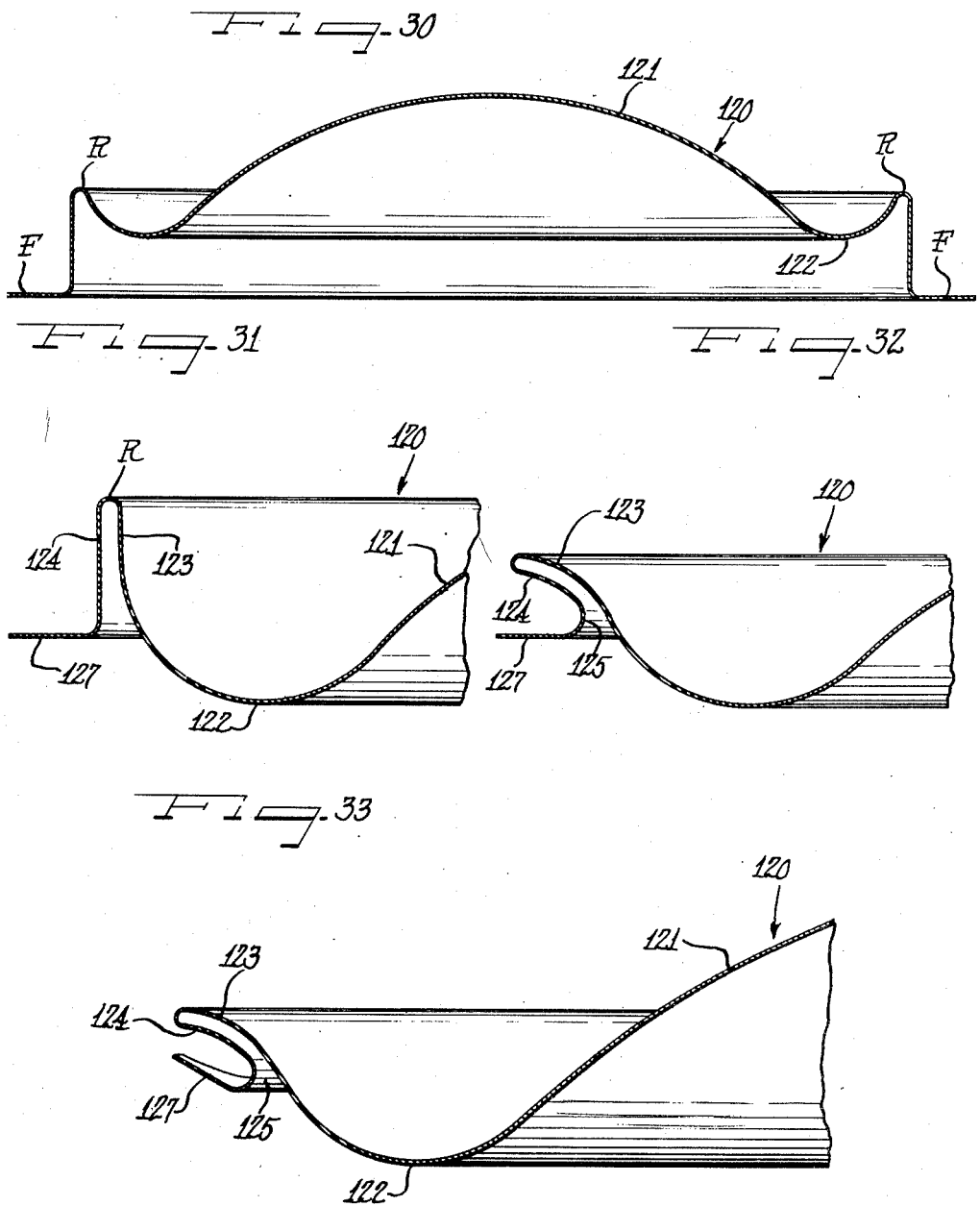

2,707,449

METHOD OF MAKING WHEEL TRIM OR COVERS

George Albert Lyon, Detroit, Mich.

Application August 3, 1953, Serial No. 371,839

19 Claims. (Cl. 113—116)

The present invention relates to the manufacture of wheel trim or covers such as are adapted to be applied to the outer sides of vehicle wheels for ornamental and protective purposes.

The subject matter of the present application has been carved from a number of my copending applications, including the following: Serial No. 16,206, filed March 22, 1948, now abandoned; Serial No. 25,836, filed May 8, 1948, now abandoned; Serial No. 29,083, filed May 25, 1948, now abandoned; Serial No. 45,323, filed August 20, 1948, now abandoned; Serial No. 100,368, filed June 21, 1949, now Patent No. 2,662,499, issued December 15, 1953; Serial No. 142,901, filed February 7, 1950, now abandoned; Serial No. 154,221, filed April 6, 1950; and Serial No. 154,222, filed April 6, 1950, now abandoned.

Certain of the figures in the drawings and accompanying descriptive matter hereof have been divided from said applications, since all of said applications have common novel features relating to the method, embracing the making of a circular wheel trim or cover having marginal self-retaining structure concealed from the front of the trim or cover by a turned marginal fold thereon.

An important object of the present invention is to provide an improved method for making wheel trim or covers.

Another object of the present invention is to provide a novel method of making an improved ornamental and protective cover for the outer side of a vehicle wheel structure to which the cover can be easily and conveniently applied by reasonable manual pressure but from which the cover can be conveniently pried free without damage either to the wheel or to the cover so that the cover is indefinitely reusable and the wheel from which the cover may be removed will be free from damage but will remain in proper condition to receive the same or a similar cover with full efficiency.

A further object of the invention is to provide a novel method of making wheel trim or covers to provide the same with especially advantageous cover-retaining structure thereon engageable in press-on, pry-off relationship with a vehicle wheel.

Still another object of the invention is to provide an improved method of making a wheel cover in a practical and efficient manner to afford the cover with marginal retaining fingers having spring steel characteristics although the material from which the cover is made is merely stainless steel sheet or other suitable metallic sheet material not inherently possessed of spring steel characteristics.

Yet another object of the invention is to provide a novel method of making wheel trim or covers which is highly versatile and adaptable not only with respect to external configuration or contour in the design of the cover, but is also readily adaptable to meet the individual requirements of different types or alloys of suitable sheet material.

Other objects, features and advantages of the present invention will be readily apparent from the following detailed description of a number of embodiments thereof taken in conjunction with the accompanying drawings, in which:

Figure 1 is a rear elevational view of a wheel cover or cap made according to the method of the present invention, as carved from my copending application Serial No. 154,221;

Figure 2 is an enlarged fragmentary side elevational view of the cover of Figure 1;

Figure 3 is a fragmentary radial sectional view through a vehicle wheel showing the cover of Figures 1 and 2 applied to the outer side of the wheel;

Figure 4 is a fragmentary enlarged radial sectional view through a marginal portion of the cover of Figure 1, taken substantially on the line IV—IV thereof, showing the same in the unstressed condition of the retaining fingers, before application of the cover to the wheel;

Figure 5 is a fragmentary sectional view similar to Figure 4 but showing the marginal structural relationships when the retaining fingers are placed under radially inward resilient deflection as occurs when the cover is applied to the wheel as shown in Figure 3;

Figures 6 and 7 have been carved from application Serial No. 154,221 and show successive initial steps in my method of making from a sheet metal blank a wheel trim or cover member as shown in Figure 1;

Figure 8 is a fragmentary bottom plane view of a cover blank partially formed to the extent indicated in Figure 7, but following a trimming step, and taken as though looking down upon the cover blank of Figure 7;

Figure 9 is an enlarged sectional view taken substantially on the line IX—IX of Figure 8;

Figure 10 is a sectional view similar to Figure 9 showing the partially formed cover following a subsequent step in the method of making the same;

Figure 11 is a sectional view similar to Figure 10 but showing the cover with the outer side thereof facing upwardly and illustrating the final step in the formation of the cover;

Figures 12, 13 and 14 are similar fragmentary radial sectional views through a modified shape of cover made substantially according to the method involving the steps illustrated in Figures 6 through 11, but with differences as illustrated and as will be more fully described hereinafter;

Figures 15, 16, 17, 18 and 19 illustrate a modification of the present method, as carved from my copending application Serial No. 45,323;

Figures 20, 21, 22, 23 and 24, comprise a consolidation of modifications carved from my applications Serial Nos. 16,206; 25,036 and 29,083;

Figures 25, 26, 27, 28 and 29 disclose a further modification of the invention, as carved from my copending application Serial No. 142,901;

Figures 30, 31, 32 and 33 are directed to exemplification of still another modification carved from my copending application Serial No. 154,222; and Figures 34, 35, 36 and 37 related to exemplification of yet another modification as carved from my copending application Serial No. 110,095, now abandoned.

It should be noted that in all species of the present invention consolidated in the present disclosure certain generic concepts prevail. In each instance the aim is to provide a wheel trim or cover for disposition at the outer side of a vehicle wheel in self-retaining, press-on, pry-off relation. In each instance, a cover is made in one piece from a sheet metal blank and is provided at its margin with retaining means formed directly in one piece therewith. The retaining means in each instance is at least substantially concealed behind an outturned marginal fold portion. The marginal fold portion is formed by turning the fold from a more or less axially directed position into a more or less radially outwardly directed position following at least partial formation of the cover-retaining means.

A preferred form of wheel cover 40 made according to the method of the present invention is depicted in Figures 1, 2 and 3. A significant feature of the cover resides in the construction whereby it is self-retaining upon a vehicle wheel comprising a wheel body 41 supporting a tire rim 42 having a side flange 43, and intermediate generally radially and axially outwardly directed flange 44 and a terminal flange 45. To this end the cover 40 is made from a single piece of sheet metal and comprises a body portion 47 having a generally radially outwardly extending marginal portion 48 of a diameter to overlie the radially inner portion of the terminal flange 45 of the tire rim. Behind the marginal portion 48, the cover carries a plurality of peripherally spaced, generally axially inwardly directed cover retaining fingers 49 each of which has a short and stiff generally radially outwardly but axially outwardly obliquely extending short and stiff gripping terminal 50 which is engageable in firm gripping, retaining engagement with the inner face of the intermediate flange 44 of the tire rim to retain the cover in place on the wheel.

Radially inwardly from the marginal portion 48 of the cover, the cover body is preferably formed with a transversely dished, concave cross-section providing a large radius generally axially inwardly extending rib-like formation arranged to project into the relatively wide annular axially outwardly opening groove defined between the tire rim and the outwardly bulging wheel body 41 and appearing from the outer side of the cover as an annular groove of substantial width between the central crown portion and the outer marginal portion 48 of the cover. The marginal portion 48 may be of generally convexly contoured cross-section merging smoothly with the concave intermediate portion 51 of the cover.

It will be observed in Figure 3 that the outside diameter of the intermediate concave-convex cover portion 51 is substantially less than the inside diameter of the tire rim intermediate flange 44 so as to provide a substantial radial space therebetween providing an ample clearance for accommodation of the retaining fingers 49 of the cover.

It will be observed that the marginal portion 48 of the cover not only effectively conceals the retaining fingers 49 therebehind, but also affords an abutment with the tire rim to limit axially inward disposition of the cover relative to the wheel. To this end, the marginal portion 48 includes an integral underturned generally return bent flange portion 52 joined to the outer side of the marginal portion by a small radius, bead-like radially outwardly projecting reinforcing rib and finishing juncture 53. The underturned marginal flange 52 is of a diameter to project radially inwardly clear of the terminal flange 45 and merges with a generally axially inwardly extending ring-like flange portion 54 from which the retaining fingers 49 extend integrally in one piece.

Each of the retaining fingers 49 extends generally axially inwardly in the plane of the flange 54 and is of generally tapering outline, with the legs or backs of the fingers gradually flaring from the retaining terminals 50 toward substantially wider form at juncture with the flange 54. For this purpose the flange 54 is, in effect, provided with spaced preferably arcuate recesses or cut-outs 55 at spaced intervals between the fingers 49. The construction and relationship is such that the tips of the terminals 50 initially project to a greater diameter than the inner face of the tire rim intermediate flange 44, substantially as indicated in dash outline in Fig. 3, and then as the cover is pressed axially inwardly into self-retaining relation to the wheel, the fingers 49 are resiliently deflected under tension generally radially inwardly as the tips of the terminals 50 cam generally axially inwardly along the inwardly sloping face of the intermediate flange 44 to the full outline position shown in Fig. 3.

For a more comprehensive description of the structure and advantages of the self-retaining finger construction thus briefly described, attention is invited to my Patent No. 2,624,634, issued January 6, 1953, on an application that was copending with all of the applications listed herein above.

In the manufacture of the cover 40, it is desirable that from an economy standpoint the cover be made from as inexpensive material as practicable. It is also desirable that the material lend itself easily to a commercially acceptable finish. Sheet brass of a suitable alloy may be used. Sheet steel is a desirable material for this purpose, and more especially stainless steel, preferably chrome-nickel steel. Among the valuable characteristics of such material is its ready workability in thin gauge stock and its ready adaptability to high lustrous polish or plating. Another and very important attribute of chrome-nickel steel sheet has been found to reside in the fact that although in the sheet before working it has primarily austenitic characteristics, it is capable of developing martensitic character on cold working. The material from which the cover 40 is made should have these characteristics because it is desirable to form the cover by drawing the metal sheet to form. An austenitic steel lends itself well to die forming but does not possess sufficient hardness and resilience to afford adequate tensioning of the retaining fingers for the cover. However, where the material is capable of developing martensitic character, that is hardness which is an attribute of a tempered, resilient steel it is possible to make the entire cover from a single piece of material, including not only the drawn body portion of the cover but also the resilient spring retaining flange and finger structure.

Highly desirable results have been obtained by using sheet steel such as 16 to 18—6 to 8 chrome-nickel or stainless steel of from .019 to .021 inch thickness or gauge. Such material will have a tensile strength of from approximately 100,000 to 125,000 pounds per square inch and a yield strength of from approximately 47,000 to approximately 49,000 pounds per square inch, while the elongation of a blank specimen subjected to tests will be from approximately 53% to 58%.

While there may be various ways of making a wheel cover such as the cover 40, a preferred method of making the cover to attain the desired form and functional characteristics on an efficient economical mass production basis comprises drawing the body portion of the cover and then drawing and cold working the marginal flange and retaining finger portion of the cover to change the austenitic material into martensitic character in the marginal portions of the cover, having the hardness and resilience requisite for the self-retaining functions of the retaining fingers.

On testing the finished retaining fingers and turned over hollow marginal formation of the cover for tensile and yield strength it will be found that they have greatly increased over these same factors in the original blank stock. For example in a cover made from chrome-nickel steel of approximately .020 gauge and tensile strength of approximately 106,000 p. s. i. and yield strength of 49,000 p. s. i. with an elongation of approximately 57%, it was found that the tensile strength had increased in the finger and cold worked marginal portion of the cover to 140,000 to 143,000 p. s. i. tensile strength and 127,000 p. s. i. yield strength with an elongation of only 10% to 29%, showing a great increase in hardness and resiliency of approximately that of tempered spring steel. In other words, there was an approximately 25% increase in tensile strength and an increase in yield strength of about 62%, with a reduction in elongation to far below 50% of that in the original blank.

On typical specimens of finished covers subjected to critical Rockwell hardness test with a superficial hardness tester, the results have shown that the hardness of the retaining fingers and retaining flange structure on the finished cover, where it is made from a material testing 71.5 on the 30-T scale, that is, the scale for testing relatively soft steel, increased to a hardness of 56 on the 30-N scale adjacent to the terminals of the retaining fingers and to 50 on the N scale at the marginal bead of the cover, the 30-N scale on the Rockwell tester indicating the hardness of tempered spring steel. This indicates a great increase in hardness over the hardness of the original stock, due to the cold working to which the marginal portions of the cover are subjected in making the cover.

As a result of the cold work hardening of the retaining structure and the marginal portion 48 of the cover the retaining fingers 49 do not act as independent self-flexing fingers which bend about some flexure point intermediate their ends, but they are tied into and secure resilient tensioning assistance from the flange and marginal structure of the cover substantially beyond the proximal or juncture ends of the fingers with the cover. This is graphically demonstrated in Figures 4 and 5. In Figure 5 the retaining finger and flange structure is shown before application to the wheel. An indicator pin 57 is mounted on the juncture rib 53 to extend radially outwardly. A similar indicator pin 58 is applied to the extremity of the cover marginal portion 48 to project axially outwardly. Another similar indicator pin 59 is applied to the marginal flange portion 48 adjacent to juncture with the intermediate body portion 51.

Upon radially inward flexure of the retaining finger 49 as indicated by the directional arrow D in Figure 5 will be found to occur a generally axially outwardly deflectional movement of the flange portion 52 as indicated by the directional arrow applied thereto, and a swinging of the indicator pins 57, 58 and 59 in the direction of the respective directional arrows associated therewith, in harmony with the retaining finger deflection.

This shows that the entire marginal formation of the cover cooperates in generating resilient resistance or tension in the retaining fingers to afford a thorough retaining, gripping, engagement of the tips of the retaining flange terminals 50 of the fingers against the inner face of the tire rim intermediate flange 44. Thereby the cover will be held on the wheel effectively against the rigors of road conditions while the wheel is in running operation on a vehicle.

These new and improved results and advantages are attained where the cover is made according to the novel method of the present invention. As a preliminary step in this method a sheet metal blank B (Figs. 6 and 8) is subjected to a drawing operation in suitable press equipment. The blank may be derived from a strip of the sheet metal such as may be supplied in the form of a continuous strip or ribbon that may be fed from a coil or roll of the material to the forming and cut-off press. Initially, an annular shallow groove is pressed in the metal blank adjacent to the margin to provide a narrow transversely arcuate rib R from which projects radially outwardly a flat flange F. The hollow annular, rounded cross-section rib R is of great importance since it ultimately will constitute in the finished cover a part of the cold work hardened, resilient marginal structure of the cover. Formation of the rib R initiates the cold working of the sheet metal of the cover marginal structure, which stretches and hardens the material and affords the desirable ultimate spring steel characteristics.

As the rib R is formed, drawing of the body portion of the cover is initiated by formation of substantially the radially outer portion of the ultimate intermediate rib portion 51 of the cover immediately adjacent to and merging with the radially inner side leg or wall defining the rib R.

Following the initial drawing operation which results in the shaping of the blank as depicted in Fig. 6, the blank is further drawn to effect deepening or elongation of the rib R and to provide the desired contour for the body portion of the cover, as depicted in Fig. 7. At this point the intermediate dished portion or wide rib 51 of the cover is completed or substantially completed and the body portion 47, including the crown area of the blank is provided with its final or substantially its final shape or contour.

Appropriate apparatus for effecting drawing of the blank B is disclosed in my copending application Serial No. 154,221. This drawing die apparatus is preferably so constructed and arranged that as the drawing of the body portion 47 progresses, the material of the blank draws inwardly through the small radius rib R to enhance the cold working and limited stretching and thereby hardening of the material.

Thereafter, the partially formed blank is subjected to a marginal trimming operation wherein the radial flange F is trimmed to provide the retaining finger extensions and intermediate recesses substantially as they will ultimately appear in the finished retaining flange and finger structure of the cover. Thus, as seen in Figure 8, after the trimming operation, the marginal flange F provides a generally scalloped outline comprising a series of spaced extensions providing the fingers 49 and intermediate arcuate recesses or cut-outs 55 therebetween. Each of the finger extensions 49 is of substantial width at its tip and the edge may be provided with a plurality, herein two, notches or recesses 60 which divide the tip into a plurality of individual gripping edge portions and afford a plurality of side edge sharp corners 61 to provide a multiplicity of torque-resisting anchorage points. Although in the exemplary embodiment illustrated, eight of the retaining finger extensions are provided for, since this is the preferred number of retaining fingers where in the cover is made from nickel-chrome stainless steel, it should be understood that a larger or smaller number of retaining finger extensions may be provided, depending upon the size of the cover, the circumstances under which it is to be used, and the material from which it is to be made. Where the material of the cover is an inherently softer grade, such as cold rolled low carbon steel sheet, or straight chrome stainless steel sheet a larger number of retaining fingers may be provided for, such as up to sixteen.

Following the trimming operation, the radially extending trimmed flange F is converted from the angular relation thereof on the outer leg of the channeled section or rib R spaced radially from the cover body, as shown in Fig. 9, into extension of said outer leg by cold working and elongating the flange progressively into axial position rearwardly of the cover into the relationship shown in Figure 10. As an incident to such working of the trimmed marginal flange F to the substantially cylindrical form depicted in Figure 10 and while holding the crown and both of the rib portions 51 and R to shape the originally radially extending portion of the flange, including the finger extensions 49 are bent drawn over a working die so that substantially martensitic, spring steel qualities are imparted to the flange and extensions. At the completion of the drawing and elongation of the retaining finger extensions 49 the angular obliquely directed retaining terminals 50 are formed.

The cover 40 is then completed, as depicted in Figure 11, by substantially collapsing and turning radially outwardly the hollow axially extending marginal rib R. This is accomplished by uniformly forcing the rib R radially outwardly about the entire annulus of the rib by imposing pressure upon the radially inner side of the rib. This may be accomplished in a restrike die assembly wherein the retaining finger extensions 49 and the intermediate portion 51 of the cover are held against relative displacement while the rib R is worked toward the collapsed, radially outwardly extending condition, that is from the dash outline position of Figure 11, to the full outline position of Figure 11. In the final condition of the turned over rib, the radially inner wall or side thereof provides the axially outwardly facing marginal portion 48 of the cover while the radially outer spaced leg of the rib provides the under-turned flange portion 52, and the peak or ridge of the rib provides the radially outwardly directed finishing and reinforcing beadlike edge of the cover. The turned-over marginal rib affords concealment for the retaining finger structure behind the outer margin of the cover and also may serve as stop means engageable with the tire rim in the fully engaged condition of the wheel cover with the wheel, as described hereinabove. Furthermore, the material of the bead in being thus folded or turned radially outwardly is substantially additionally cold worked whereby to impart additional hardness and resilience thereto. The structure of the cover is now completed and ready for use.

Straight chrome stainless steel has been used successfully in production of the covers but offers certain problems in drawing of the sheet since it is not susceptible of quite the elongation in any single draw that chrome-nickel stainless steel permits. In adapting my method to the use of straight chrome steel essentially the same steps are followed as have already been described in connection with Figures 6 through 11. However, the first drawing step, the results of which are depicted in Fig. 6, is desirably divided into two operations comprising a first draw and a second or form restrike draw. This modification in the method is depicted in Figures 12 and 13, in connection with the formation of a slightly modified, but nevertheless one piece cover structure 65.

In the first draw as depicted in Figure 12, the margin of the blank is provided with a radially extending flange F which merges directly and without any intermediate rib formation with the radially outer side of a depressed or dished intermediate inwardly directed rib 67 defining an outwardly opening annular groove of substantial width in the cover blank or body. In the same draw the cover body is contoured to roughly or generally the shape desired comprising an outwardly projecting crown portion 68 bordered by a rib portion 69. In thus initially drawing the blank, it is cold worked and hardened to a certain extent, and more especially the marginal portion of the blank is substantially cold worked by reverse bending the same over appropriate working die structure which, at the conclusion of the draw leaves an annular indentation 70 in the flange F.

In the second phase or step in the modified method, as depicted in Fig. 13, the marginal flange F is completely drawn through the bend-working area of the dies and the radially inner portion of the flange, in cooperation with the radially outer portion of the intermediate dished rib portion of the cover is shaped to provide a marginal rib R. For this purpose the radially inner portion of the flange F is worked into axially inwardly elongated form to provide the axially outer wall or leg of the rib. At the same time the body portion of the cover is drawn to final shape wherein the curves of the crown portion 68 may be flattened, the juncture depression or inset between the bordering rib 69 and the crown deepened and the radially outer side of the rib 69 defining the radially inner side of the intermediate portion 67 of the cover may be further formed as by providing a series of annular corrugations 71 therein.

Completion of the cover 65 may then proceed substantially as described for making the cover 40, with the slight exception that in the final marginal shaping of the cover 65 radially outward turning, folding and bending of the rib or rib section R from the dash line position shown in Fig. 14 to the final full line position involves coincidently shaping the radially inner side thereof and the adjacent portion of the radially outer side wall of the intermediate portion 67 of the cover into generally oblique radially and axially inwardly extending section which is preferably afforded a slightly concave cross-section almost to the tip 72 of the bead-like fold which results from collapsing and radially outwardly turning the rib R into overlying, substantially concealing relation to axially inwardly directed retaining finger extensions 73 formed from the turned back flange F. It will be observed that the axially outer leg or side of the rib R provides an oblique underturned flange portion 74 rather than a more radially extending flange portion as in the cover 40. It has been found that the final structure as shown in Fig. 14 affords a cover in which the margin is possessed of substantial resilient flexibility enabling the cover margin to follow and adapt itself more readily to operating distortions and weaving of a tire rim on which the cover may be mounted in service.

In the modification depicted in Figures 15 through 19, a four finger cover is produced wherein the fingers are of substantial width and are formed from the corners of a square blank. This cover is identified generally by the numeral 75 (Fig. 19) and has a crowned body portion 77, an intermediate dished annular inwardly depressed rib-like portion 78, an outturned marginal portion 79, an underturned marginal flange 80 merging with a generally axially inwardly directed annular flange 81, and cover retaining finger extensions 82 from the flange 81 provided with outturned generally radially and axially outwardly oblique retaining terminals 83 engageable with a flange of a wheel, such as the intermediate flange of the tire rim of a vehicle wheel.

In the initial draw of a suitable sheet metal blank in the formation of the cover 75, as best seen in Figures 15 and 16, the crown body portion 77 and the intermediate depressed outwardly opening groove and inwardly directed large rib-like annular portion 78 are at least substantially shaped to the final contour while a shallow axially outwardly directed narrow hollow rib R is formed at the outer side of the intermediate portion 78 where it joins a radially extending marginal flange F. The flange F is then trimmed to provide the finger extensions 82 as radial corner projections having the tips thereof of arcuate outline. Then, as depicted in Fig. 17, the rib R is axially elongated and the flange F is cold worked and converted into an extension of the radially outer axially extending leg of the rib R. Cold working of the flange F is accomplished by bending the same in one direction as indicated at B and then bending the same again and working it into the generally cylindrical form, from the dash line position to the full line position of Figure 17. At the conclusion of this step in the method, the retaining terminals 83 comprise radially outwardly extending flanges.

Completion of the cover 75 is then effected by turning the rib R from the dash line position shown in Fig. 18 generally radially outwardly into folded condition shown in full outline, wherein the radially inner side of the rib becomes the outer marginal portion 79 and the radially outer side of the rib becomes the underturned flange 80. The generally frusto-conical shape of the radially outwardly folded flange, as a result of the cold working and hardening of the material, is substantially resilient and while it may be deflected resiliently to enable following of a wheel part to which the same may be applied in service, effectively resists damaging deformation. As a final step, the terminals 83 are bent to the oblique acute angular relation to the axially extending finger extensions 82, as shown in Fig. 19. The outturned fold flange 79, 80 resulting from turning the rib R radially outwardly effectively conceals the retaining finger structure there behind and reinforces the outer margin of the cover.

In Fig. 23 is shown a cover 85 which, although it is much the same as the cover 75 just described, has a slightly different cover retaining marginal structure. To this end the cover 85 comprises a crowned body portion 87, an intermediate dished annular outwardly opening channel and inwardly directed large rib portion 88, and a marginal portion 89. The marginal portion 89 is substantially frusto-conical and has extending there behind an underturned flange 90 joined thereto on a reinforcing and finishing edge bead 91. Projecting axially inwardly from the flange 90 is a flange portion 92 having a series of generally axially inwardly directed retaining finger extensions 93 each of which has a wheel engaging terminal structure 94, herein in the form of outwardly bowed terminals 94.

The cover 85 may be produced by the method described in connection with Figures 16, 17 and 18. That is, the marginal outturned fold may be shaped as an axially outwardly directed hollow rib R as indicated in dash outline in Fig. 22, and then this hollow rib is folded upon itself and bent generally radially outwardly to the full line position in Fig. 22, whereafter the terminal formations 94 are formed in the finger extensions 93.

On the other hand, the cover 85 may be made in the modified manner depicted in Figures 20 and 21. According to this modification, a sheet metal blank is initially drawn to provide the crown body portion 87, the intermediate dished portion 88, the initial narrow hollow rib formation R and the radially extending marginal flange F. The flange F is then trimmed to provide the finger extensions and the trimmed flange is cold worked into generally cylindrical axially inwardly directed form as shown in full outline in Fig. 20. Next, the rib R is substantially elongated with a corresponding shortening of the flange 92. Instead of more or less straight axially, the rib R may be turned somewhat radially outwardly as it is being elongated, substantially as depicted in Fig. 21. This may be accomplished by holding the crown portion or body of the cover blank to shape and substantially against deflection and pressing against the flange formation 92 uniformly in the direction of the rib R to elongate the rib while, as in Fig. 21, starting the radially outward deflection thereof. Thereafter, the hollow rib R is folded and further turned radially outwardly into the finished shape as shown in Fig. 23. The finger terminals 94 are shaped at a suitable interval, as for example at the conclusion of the other cover forming steps. It will be appreciated, of course, that in the cold working of the flange F and the walls of the rib R up to the folding and radially outward turning thereof substantial hardening and thereby resilience is attained in the material of the cover marginal structure.

The modified cover 95 in Fig. 24 is adapted to be made by either of the modifications of the method described in connection with Figures 15 through 18 or Figures 20 and 21, and differs from the covers 75 and 85 primarily in the cover retaining terminal portion of the axially inwardly extending cover retaining flange structure. To this end, the cover 95 comprises a crowned body portion 97, an intermediate transversely dished annular axially outwardly opening groove and axially inwardly directed wide rib portion 98, a generally radially outwardly directed, frusto-conical marginal portion 99 having therebehind a return bent underturned flange 100 joining the same on a finishing and reinforcing bead juncture 101. From the flange 100 extends a generally axially directed annular flange 102 which terminates in an outwardly curled tight resilient retaining bead 103. This bead adapts the cover to engage retaining bumps on a flange of the wheel to which the cover is applied in service. The flange portions 99, 100 and 102 are adapted to be cold worked and thereby of improved hardness and resilience in the finished cover. It will be understood that the marginal portions 99 and 100 are derived by folding a generally axially extending hollow rib generally radially outwardly into substantially concealing relation to the retaining flange 102 therebehind.

In Figures 25 to 29, inclusive, the method of making a wheel cover 105, according to the present invention is depicted. This cover is provided with a crowned central body portion 107, an intermediate transversely dished annular outwardly opening grooved and axially inwardly rib-like portion 108 and an outer marginal generally convex portion 109. Behind the marginal portion is an underturned generally radially inwardly directed annular flange 110 provided with a generally axially inwardly turned continuous annular resilient flange portion 111 from which extends a series of peripherally spaced curled retaining fingers 112. The construction, relationship and arrangement of the fingers 112 is such that they are engageable under resilient gripping and retaining, press on, pry off relation within a radially inwardly opening annular groove 113 provided by a terminal flange 114 of a tire rim 115 of the conventional multi-flanged drop center type adapted to support a pneumatic tube and tire assembly 117 and carried by a disk spider wheel body 118. The retaining fingers 112 are formed as radially outwardly directed curls having substantial resilience and being contractile from a somewhat larger diameter than the inside diameter of the groove 113 so as to maintain resilient radially outwardly pressure within the groove for retaining the cover floatingly in place on the wheel.

In making the cover 105 from appropriate sheet material the body portion 107, the intermediate large axially inwardly directed rib 108, a marginal axially outwardly directed annular small radius hollow rib R and a radially directed flange F are initially drawn (Fig. 25). Then, the flange F is cold worked and converted from the radially outwardly angular original position thereof into axially inwardly directed position as extension of the radially outer wall of the rib R. This radially outer wall of the rib, of course, subsequently provides the underturned flange 110. Trimming of the flange F to provide the finger extensions may, of course, be performed before turning of the flange into axial alignment with the rib outer side wall. The condition of the partially formed cover blank after elongation of the outer side wall of the rib R by axial turning of the flange F is shown in Fig. 26. It will be noted that at this stage the distal terminals of the finger extensions 112 are turned generally radially outwardly as shown at T.

Thereafter, the rib R is collapsed and turned generally radially outwardly as shown in Fig. 27 to provide the finished marginal portion 109 and the underturned flange 110 and with the turned margin substantially concealing the retaining structure therebehind. Finally, the finger extensions 112 are curled in suitable curling die equipment, wherein the turned terminals T assist in guiding the curling, until substantially the curled shape shown in Figures 28 and 29 is attained. The cover is now ready for application to a wheel by pressing the same axially into position on the wheel.

In Figures 30 through 33, a cover 120 and various steps of the method of making the same are depicted. Fundamentally, the cover 120 is made by method steps much the same as hereinbefore described. In its finished form the cover 120 is similar to the cover 105 in that the retaining structure thereof is adapted to engage with the terminal flange of a tire rim of a wheel to which the cover may be applied. To this end the cover 120 comprises a crowned body portion 121, an intermediate dished large annular outwardly opening groove and axially inwardly directed rib-like portion 122, an outer marginal portion 123 having therebehind an underturned generally radially inwardly directed flange 124 provided with a generally axially inwardly directed inner portion 125 from which extends a series of generally radial cover retaining finger extensions 127 may be in any preferred number disposed uniformly about the periphery of the cover, eight such fingers having been found a desirable number.

In making the cover 120, a suitable sheet metal blank is drawn to provide the crown portion 121, the intermediate portion 122, at least the start of a marginal axially outwardly directed rib R and a radially outwardly extending flange F. In this instance either as an incident to the initial drawing, or as a second step, and before or after trimming the flange F to provide the finger extensions, the radially outer side wall of the rib R is substantially axially inwardly elongated as shown in Fig. 30.

The next step in making the cover 120 comprises deepening the rib R from the shallow structure shown in Fig. 30 to the deep axially extending formation shown in Fig.

31. As a result, the flange portion 124, now comprising the radially outer side of the hollow rib R, is brought into spaced opposition to the adjacent marginal portion 123 of the cover body comprising the radially outer side of the angular channel portion 122, the radially inner and radially outer sides of the rib being connected by a small radius crown or ridge.

Following this, as shown in Fig. 32, the rib R is turned radially outwardly into overlying relation to the retaining finger extensions 127 by somewhat collapsing the rib and folding the same uniformly outwardly about the entire perimeter of the cover. The radially outer side of the rib comprising the flange 124 now assumes its underturned relation to the radially inner side of the rib which becomes the convex outer marginal portion 123 of the cover. The rounded peak of the rib provides a small radius reinforcing rib-like or bead-like periphery for the cover, effecting a finishing and reinforcing edge.

As the final step, Fig. 33, the retaining finger extensions 127 are bent from the radially extending plane thereof to a diagonal position closer to the underturned flange 124, that is to extend generally radially and axially outwardly obliquely. The cover is now ready to be applied to the outer side of a vehicle wheel by engaging the terminal portions of the retaining fingers 127 against the tip of a tire rim terminal flange and pressing axially inwardly on the cover until all of the fingers 127 have entered into wedging, retaining, biting engagement with the radially inwardly facing surface of the terminal flange under radially inward compressive force placing the retaining fingers and the connective flange structure of the cover under resilient tension.

As a result of the cold working to which the marginal portions 123, 124, 125 and the fingers 127 are subjected in the drawing and bending thereof, a hardness and tensile strength and resilience are attained which are substantially greater than the original material and having substantially the characteristics of tempered spring steel. As a result, the flange portions 124 and 125, and the marginal portion 123, afford strong resilient backing for the retaining fingers 127 accompanying the resilient radially inward deflectional pressure against the tips of the retaining fingers 127 which occurs when the cover is applied to the outer side of a wheel. The retaining fingers 127 are thereby stressed into strong, efficient self-retaining engagement at their tips with the tire rim terminal flange.

In the modification of Figures 34 through 37, a cover 130 on the order of the cover 40 is depicted, but with the additional feature of means for centering the cover and holding it against a torque displacement. To this end, the cover 130 comprises a preferably crowned central or body portion 131, an intermediate trough-like or axially outwardly opening channel shaped, dished, axially inwardly large rib-like portion 132, an outturned marginal portion 133 having an underturned generally radially inwardly directed flange 134 joined thereto by bead-like small radius finishing juncture edge portion 135. At its inner terminus the underturned flange 134 has a continuous annular generally axially inwardly directed flange portion 137 provided with a series of preferably eight generally axially inwardly directed retaining finger extensions 138. Each of the finger extensions has a generally radially and axially outwardly oblique, acute angled short and stiff wheel flange engaging retaining terminal flange 139, preferably provided with a plurality of indentations or notches 140.

The cover 130 is adapted to be applied to the outer side of a vehicle wheel which may comprise a disk spider body 141 supporting a tire rim 142 of the multi-flange, drop center type comprising a side flange 143 merging with a generally radially and axially outwardly sloping intermediate flange 144 extending to a terminal flange 145. The tire rim is adapted to support a pneumatic tire and tube assembly 147 from which extends a valve stem 148 projecting in service through a valve stem aperture 149 in the side flange 143 of the tire rim.

The wheel cover 130 is applied to the outer side of the wheel by generally coaxially disposing of the same relative to the outer side of the wheel and then pressing axially inwardly on the cover to effect engagement of the terminals 139 of the retaining fingers 138 with the intermediate flange 144 of the tire rim, in substantially the same manner as described hereinabove in connection with the cover 40.

In the present instance, the cover 130 is provided with a series, herein preferably comprising four finger extensions 150 which are sufficiently longer than the retaining finger extensions 138 to effect engagement with the side flange 143 of the tire rim when the cover is fully upon the wheel, for thereby holding the cover in spaced relation to not only the wheel body, but to the tire rim except where the finger extensions 150 engage the tire rim. By preference at least one of the stop finger extensions 150 has a pair of generally radially inwardly directed terminal ear portions which are engageable about the base portion of the valve stem 148 for thereby holding the cover against rotary or torque displacement on the wheel in service. This is valuable in preventing turning of the cover out of registration with the valve stem 148 which in the assembly projects through a valve stem aperture 152 in the intermediate portion 132 of the cover.

The method of making the cover 130 may follow substantially the steps hereinabove described in connection with the making of cover 40. Accordingly, having reference to Figure 34, a sheet metal blank as depicted in dash outline is drawn to provide the body or crown portion 131 of the cover, the intermediate dished portion 132, a generally axially outwardly extending hollow rib R and a radially outwardly extending flat flange F is trimmed to provide the finger extensions 138 and the finger extensions 150 preferably disposed symmetrically between spaced pairs of the finger extensions 138. The cover now has substantially the cross-sectional contour as shown in dash outline in Fig. 35. Then the flange F, and more particularly the finger extensions are cold worked and bent from the angular relationship depicted into axially inward elongation or extension of the radially outer axially extending wall of the rib R and the finger terminals 139 bent angularly to the finger extensions. The centering and stop finger extensions 150 may be completed coincident with formation of the retaining fingers 138, or they may be completed as an additional step in finishing of the cover. The principal forming operation to which the stop finger extensions 150 are subjected is the bending inwardly toward one another of the wing-like or ear flanges 151 as best seen in Fig. 36.

For effectively concealing the finger structure behind the outer margin of the cover and also for rigidifying and strengthening the cover margin, the hollow rib R is turned generally radially outwardly to provide a marginal overhanging fold as depicted in full outline in Fig. 35 and wherein the radially outer wall of the rib becomes the underturned flange 135 and the inner terminal portion 137 of such flange, and the radially inner spaced wall of the rib becomes the cover marginal portion 133 which faces axially outwardly on the cover.

It will be appreciated that the marginal flange and retaining structure on the cover 130 is cold work hardened and thereby rendered effectively flexibly resilient substantially as hereinbefore described.

From the foregoing it will be appreciated that the present invention has effectively solved the problem of providing a commercially advantageous mass production method of making wheel trim or covers, and more especially covers of the full disk type, that is for covering substantially the entire wheel including the wheel body and the tire rim, completely from single blanks of sheet metal. The present method eliminates the need for special, separately formed and secured springs or the like for retaining the covers on the wheel. The finished cover is self-retaining upon the wheel through the provision on the margin of the cover of retaining structure that is engageable with a portion of the wheel as an incident to applying the cover to the wheel. Great versatility has been demonstrated herein for adaptation of the retaining structure to various service requirements. However, it should be noted that by far the commercially most valuable form of the retaining structure disclosed is that associated with the cover 40 and those forms of cover having similar self-retaining generally axially extending finger extensions mutually cooperative through an axially extending portion of the retaining flange structure behind the marginal formation of the cover and equipped with short and stiff radially and axially outwardly oblique gripping terminals that are engageable retaining with the intermediate flange of a tire rim for holding the cover on the wheel.

In all forms of the cover, the marginal cover retaining structure is cold work hardened for imparting thereto the substantially spring steel characteristics for resilience and durability necessary to meet the rigors of service encountered in connection with vehicle servicing and operation.

In all forms of the cover, the intermediate trough-like, channel shaped inwardly directed annular rib-like portion affords, in addition to a desirable ornamental appearance for the cover, a rigidifying structure radially inwardly from the marginal, cover retaining structure of the cover. The present method facilitates the formation of the cover retaining marginal structure extending generally axially behind the marginal extremity of the cover, by the initial provision of the hollow axially outwardly directed marginal rib which projects in the opposite axial direction from the intermediate rigidifying channel shaped rib, and the radially outward turning of the narrow marginal rib to provide a retaining structure concealing radial flange and a rigidifying and finishing edge formation on the cover.

Finishing of the outer side of the cover may be effected at some intermediate stage in the completion of the cover, but may be effectively accomplished following completion of the drawing and formation steps of the method. Such finishing may take the form of polishing and buffing, or plating and buffing, or painting and baking, or a combination of these finishing expedients.

In each instance the cover is adapted to be applied to the wheel by pressing it axially into position on the wheel. The cover is then retained by the self-retaining means until it is desired to remove the cover which may be effected by insertion of a pry-off tool such as a screwdriver behind the hardened, resilient radially turned marginal fold and effecting pry-off leverage therebehind to dislodge the retaining structure from the tire rim of the wheel. The spring metal characteristics of the retaining structure assure that it will remain free from damage as an incident to pry-off, where that is done with ordinary care, so that the cover can be used over and over again without impairment of the self-retaining characteristics of the retaining structure.

Although the full disk type of cover is commercially in greatest volume demand, it will be appreciated that the trim or covers may also be provided as trim rings to be associated with conventional hub caps, where there is demand for such a combination.

It will be understood that modifications and variations may be effected without departing from the scope of the novel concepts of the present invention.

I claim as my invention:

1. In a method of making wheel trim or covers, the steps of drawing a sheet metal blank to provide a body portion and a marginal narrow hollow annular rib projecting axially from the outer face of the cover with a radially outwardly extending flange structure thereabout, converting the radially outwardly extending flange structure from the angular relation to the radially outer side leg of said rib into an axially rearwardly directed extension of the outer leg of the rib by working and elongating the flange structure progressively in the axially inward direction behind the margin of the cover, and substantially collapsing and radially outwardly turning said rib.

2. In a method of making wheel trim or cover, drawing a sheet metal blank to provide a body having an annular axially outwardly opening trough-like channel defining an axially inwardly directed dished rib and a narrow hollow rib-like channeled section opening rearwardly and projecting generally axially outwardly at the radially outer side of said first mentioned channeled rib and with a radially outwardly directed flange structure on the radially outer wall or leg of said section and inset relative to the ridge or peak of said section, turning said flange structure generally axially inwardly into extension of said radially outer wall leg of said section, substantially collapsing and radially outwardly bending said section to provide a marginal flange fold overlying said flange structure, and forming cover retaining means on said flange structure.

3. In a method of making a wheel trim or cover, drawing a sheet metal blank to provide a body having an annular axially outwardly opening trough-like channel defining an axially inwardly directed dished rib and a narrow hollow rib-like channeled section opening rearwardly and projecting generally axially outwardly at the radially outer side of said first mentioned channeled rib and with a radially outwardly directed flange structure on the radially outer wall or leg of said section and inset relative to the ridge or peak of said section, trimming said flange structure to provide retaining finger extensions, turning said flange structure generally axially inwardly into extension of said radially outer wall leg of said section, substantially collapsing and radially outwardly bending said section to provide a marginal flange fold overlying said flange structure, and bending the terminals of the finger extensions to project generally radially outwardly for engagement with a flange of a wheel.

4. In a method of making a wheel trim or cover, drawing a sheet metal blank to provide a body having an annular axially outwardly opening trough-like channel defining an axially inwardly directed dished rib and a narrow hollow rib-like channeled section opening rearwardly and projecting generally axially outwardly at the radially outer side of said first mentioned channeled rib and with a radially outwardly directed flange structure on the radially outer wall or leg of said section and inset relative to the ridge or peak of said section, turning said flange structure generally axially inwardly into extension of said radially outer wall leg of said section, substantially collapsing and radially outwardly bending said section to provide a marginal flange fold overlying said flange structure, and curling said flange structure to provide a radially outwardly projecting wheel-engaging bead thereon.

5. In a method of making a wheel trim or cover, drawing a sheet metal blank to provide a body having an annular axially outwardly opening trough-like channel defining an axially inwardly directed dished rib and a narrow hollow rib-like channeled section opening rearwardly and projecting generally axially outwardly at the radially outer side of said first mentioned channeled rib and with a radially outwardly directed flange structure on the radially outer wall or leg of said section and inset relative to the ridge or peak of said section, turning said flange structure generally axially inwardly into extension of said radially outer wall leg of said section, substantially collapsing and radially outwardly bending said section to provide a marginal flange fold overlying said flange structure, as an incident to said folding and bending of said section shaping the outer side thereof into convex external shape merging on ogee curvature with the radially outer side of said first mentioned rib structure, and forming cover retaining means on said flange structure.

6. In a method of making a wheel trim or cover, drawing a sheet metal blank to provide a body having an annular axially outwardly opening trough-like channel defining an axially inwardly directed dished rib and a narrow hollow rib-like channeled section opening rearwardly and projecting generally axially outwardly at the radially outer side of said first mentioned channeled rib and with a radially outwardly directed flange structure on the radially outer wall or leg of said section and inset relative to the ridge or peak of said section, turning said flange structure generally axially inwardly into extension of said radially outer wall leg of said section, substantially collapsing and radially outwardly bending said section to provide a marginal flange fold overlying said flange structure, and coincident with said folding and bending of said section shaping the radially inner side thereof into generally oblique radially and axially inwardly extending section cooperating with the radially outer side of said first mentioned channeled section to afford therewith a marginal structure having resiliently deflectional characteristics, and forming cover retaining means on said flange structure.

7. A method of making a vehicle wheel cover which comprises drawing a stainless steel blank into a circular body formation, drawing an annular hollow rib on the blank and extending axially outwardly, trimming the margin of the blank radially outwardly of the rib into a plurality of retaining finger extensions, cold working said retaining finger extensions in axially inward direction away from the rib to a hardness and tensile strength of tempered spring steel, and cold working said hollow rib by turning the same generally radially outwardly into concealing relation to said finger extensions.

8. A method of making a circular wheel cover from chrome-nickel stainless steel sheet having austenitic characteristics which comprises stamping a blank of the steel sheet into a circular body having a radially extending margin, drawing an annular rib axially outwardly by progressive stages of elongation in the margin of the blank and trimming and shaping the marginal extremity of the blank into a plurality of generally axially inwardly extending retaining finger extensions on the radially outer side of said rib, and cold working said rib by turning the same generally radially outwardly into overlying concealing relation to said finger extensions, thereby imparting martensitic characteristics to said finger extensions and said turned rib.

9. In a method of making a wheel cover, the steps of dishing a sheet metal blank by pressing a central crown formation therein and forming the margin of the blank into an angularly related flange formation, holding the crown portion against deflection and pressing against said flange formation and thereby folding the flange formation upon itself adjacent the juncture with the crown portion into a tucked generally open fold, deflecting the fold radially outwardly and pressing a portion of the fold substantially closed spaced radially inwardly from the fold extremity, and shaping the fold extremity into a bead-like reinforcing rib.

10. In a method of making a wheel cover, the steps of forming a sheet metal disk blank into generally cup-shape with a generally axially extending marginal flange formation and a body portion joining the marginal flange formation on a curved juncture, pressing the flange formation axially while holding the body portion against movement and thereby forming a generally open fold, deflecting the extremity portion of the fold radially outwardly, and forming a bead-like reinforcing rib at the fold extremity while substantially closing a portion of the remainder of the fold upon itself spaced radially inwardly from said extremity reinforcing rib.

11. The method of making a wheel cover from a single blank of sheet metal which comprises initially drawing a crown portion and a preliminary relatively narrow rib extending in the same direction as the crown portion and separated therefrom by an oppositely extending relatively large juncture rib, the margin of the blank being maintained substantially flat, trimming the margin of the blank to provide a plurality of radially outward retaining finger or clip extensions on the margin, and thereafter bending the narrow rib radially outwardly to place said extensions in axial position behind said narrow rib.

12. An improved method for making a vehicle wheel cover from a single blank of sheet metal and which comprises initially drawing a sheet metal blank to provide a concave convex circular cover portion and an annular bordering rib projecting axially from said cover portion while substantially maintaining the margin of the blank in its original flat plane, trimming said margin to provide a series of radial projections, turning said margin into axial generally cylindrical form directed opposite to said rib, forcing said margin in the direction of said rib to elongate the rib, collapsing the rib and turning the same generally radially outwardly so that said projections are spaced radially inwardly from the radially outer edge defined by the collapsed rib, and generally radially outwardly bending the extremity portion of each of said projections to increase the resiliency thereof and adapt the same to serve as retaining spring fingers for the cover engageable with a part of a vehicle wheel to which the cover may be applied.

13. A method of making a wheel cover which comprises stamping a sheet metal blank to provide a central crown portion with a flat marginal extremity portion and a juncture between the crown portion and the marginal extremity portion comprising a relatively large annular rib extending generally opposite to the crown and a relatively small annular rib extending in the direction of the crown but disposed contiguous the flat margin, holding the crown and both of said ribs to shape and bending the marginal extremity portion into cylindrical shape conterminous with the radially outer side of the smaller rib and thereafter, while holding the crown and large rib as well as the cylindrically shaped marginal extremity portion to shape and in place, compressing the small rib and the contiguous areas of the marginal portion and of the large rib to form a fold flange directed angularly to the cylindrical marginal extremity portion and generally radially outwardly, and forming a reinforcing and finishing bead-like edge for the cover at the juncture of the walls of the radially outwardly extending fold flange.

14. The method of making a wheel cover, which comprises shaping an inner portion of a sheet metal blank while holding the margin of the blank in substantially its original flat state, forcing the juncture area between the margin and said central portion generally axially into a fold and coincident with such forcing of the fold working the margin by reverse bending throughout a substantial portion of its area and then straightening the margin throughout most of its area beyond the fold to project axially in the opposite direction from the fold, bending the fold generally radially outwardly, and forming the extremity of the axially extending margin into cover retaining structure.

15. In a method of making wheel covers, the steps of blanking a polygonal sheet metal blank to provide a crown portion projecting to the outer side of the cover blank and a marginal portion with an annular rib at the periphery of said portion and said rib projecting in the same direction as the crown and formed with a radially outer wall extending axially rearwardly, the remainder of the blank remaining flat at the corners, severing the blank corner portions to provide retaining extension fingers, turning said fingers axially into substantially parallelism with the side of said rib and turning the ends of the retaining finger portions generally radially and axially into divergent relation to the body portions of the fingers, and collapsing said rib and bending the same generally radially outwardly into concealing relation to said fingers.

16. In a method of making wheel covers, the steps of blanking a polygonal sheet metal blank to provide a crown portion projecting to the outer side of the cover blank and a marginal portion with an annular rib at the periphery of said portion and said rib projecting in the same direction as the crown and formed with a radially outer wall extending axially rearwardly, the remainder of the blank remaining flat at the corners, severing the blank corner portions to provide retaining extension fingers and cover-stopping finger extensions longer than said retaining fingers, turning said fingers axially into substantially parallelism with the side of said rib and turning the ends of the retaining finger portions generally radially and axially into divergent relation to the body portions of the fingers, collapsing said rib and bending the same generally radially outwardly into concealing relation to said fingers, and bending said cover-stopping finger extensions to form wing flanges at the terminal ends thereof.

17. In a method of making a wheel cover from thin sheet metal stock, the steps of forming a circular body portion in a thin sheet metal blank with an axially extending annular marginal folded rib the radially outer side of which is defined by an axially extending flange, trimming the terminal portion of said flange into a plurality of finger extensions, working and deepening said axially extending rib to bring substantially all of the axially extending flange into opposition to the material of the cover at the radially inner side of the rib, and turning the deepened rib including said axially extending flange to the juncture with said finger extensions radially outwardly into substantially concealing relation to said finger extensions.

18. In a method of making from a sheet metal blank a single circular wheel cover or trim member wherein substantially the entire outer periphery of the blank is employed to form the periphery of and retaining means for the single member, the steps of centrally dishing the blank body to provide an annular generally axially extending dished surface, cold working the outer blank margin to form therein an annular rib of generally U-shaped cross-section and with a radially inner leg merging into said dished surface and with its other and outer leg merging into a cover retaining flange, bending said rib laterally and radially outwardly through and beyond the circle of said flange into a position at an angle to said dished surface whereby to increase the overall diameter of the ensuing member and with said flange extending generally axially thereunder and radially inward thereof and forming a portion of the flange to provide cover retaining means.

19. The method of claim 18 further characterized by the increasing of the effective retaining diameter of said portion of said flange for wheel gripping engagement.

References Cited in the file of this patent

UNITED STATES PATENTS

| | | |
|---|---|---|
| 1,385,290 | Welling | July 19, 1921 |
| 2,162,734 | Lyon | June 20, 1939 |
| 2,239,897 | Lyon | Apr. 29, 1941 |
| 2,282,588 | Lyon | May 12, 1942 |
| 2,368,228 | Lyon | Jan. 30, 1945 |
| 2,535,081 | Lyon | Dec. 26, 1950 |
| 2,574,491 | Lyon | Nov. 13, 1951 |
| 2,607,633 | Lyon | Aug. 19, 1952 |
| 2,624,634 | Lyon | Jan. 6, 1953 |
| 2,624,635 | Lyon | Jan. 6, 1953 |
| 2,660,479 | Lyon | Nov. 24, 1953 |